GAMBLE & HILL.
Candle Mold.

No. 2,405. Patented Dec. 30, 1841.

UNITED STATES PATENT OFFICE.

JAMES GAMBLE AND JOSEPH S. HILL, OF CINCINNATI, OHIO.

APPARATUS FOR MOLDING CANDLES.

Specification of Letters Patent No. 2,405, dated December 30, 1841.

*To all whom it may concern:*

Be it known that we, JAMES GAMBLE and JOSEPH S. HILL, of Cincinnati, in the county of Hamilton, State of Ohio, have invented a new and Improved Mode of Making Mold-Candles; and we do hereby declare that the following is a full and exact description.

Figure 1:
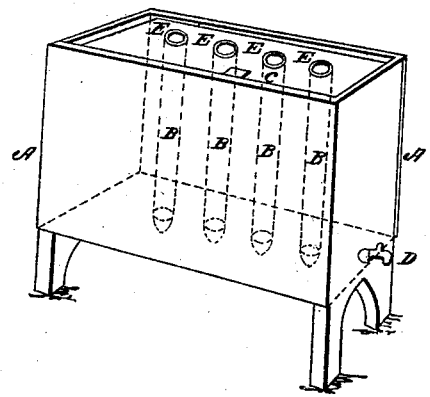

The nature of our invention consists in making a water tight box, A, A, in the accompanying draft Figure 1, of wood or other material, into the top of which the molds B, B, (usually employed) are inserted, let down and made fast, the lower ends of the molds being also made fast by insertion through the bottom of the said box. The box may be made larger or smaller, to contain any number of molds. Into the top of the box is also perforated a hole C, into which ice water is poured, to fill the box, for the purpose of cooling the candles in warm weather and at the lower part of the box, either in the bottom or side is a cock D to let off the water when required.

Figure 2:
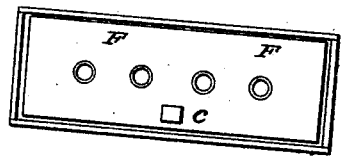

The top of the box is either scooped into cups E, E, E, E, around the insertion of the molds, or the whole top as in Fig. 2 F, F, depressed or dug out, after the manner of a tray, into which the tallow may be poured to run into all the molds at once, the hole C into which the water is poured being first covered so as not to admit the warm tallow, or has its edges raised to a height equal to the edges of the general surface to protect it from the entrance of the tallow. The ice water may be either filled into the box before or after the pouring in of the tallow, or at the same time. The box must be filled with the water, made sufficiently cold to cool the candles completely.

The accompanying drawing, Fig. 1, exhibits on a small scale, a simple box upon the above principle, with a very few molds inserted. But five hundred or a thousand molds may be inserted and cooled at once by the same on a larger scale.

The advantages of this mode of cooling mold candles are the following: 1. Less labor is required to fill a box of the above kind with cold water than the old modes used which are either to expose the molds to cool atmosphere, or to dip them in cool water, or to pack pounded ice around each mold. 2d. The candles are cooled in larger quantities at one operation, and with more uniformity and certainty than by any process hitherto employed. 3d. The candles thus manufactured are a handsome article and possess this advantage over the steam molds that they pull out without being steamed and retain their polish better, which is destroyed by the external application of artificial heat to the mold. 4. The present invention is a much less expensive mode of making candles than any now used. No heat is employed but to warm the tallow, or other material of the candles, previous to filling the molds. There is also great saving of ice which is an expensive article. Five hundred candles may be molded and cooled almost with the same ease as 50. Fewer hands are employed, and the article thus manufactured will have preference in the market being a handsomer article than the steam molds, and cheaper made than other candles, &c.

There are other advantages in this invention not now necessary to be enumerated.

What we claim as our invention and desire to secure by Letters Patent is—

The application of cold water to the candle mold in any quantity at one operation by inserting those molds permanent by (or not) in a water tight chest, which can be filled and drawn off at pleasure.

JAMES GAMBLE.
JOSEPH S. HILL.

Witnesses:
EDWD. P. CROUCH,
JAMES HAFFIN.